United States Patent
Earl et al.

(10) Patent No.: US 10,776,596 B2
(45) Date of Patent: Sep. 15, 2020

(54) DEVICE AND METHOD OF READING A MARK PRINTED ON CONTAINERS MOVING ALONG A CONVEYOR

(71) Applicant: SICPA HOLDING SA, Prilly (CH)

(72) Inventors: Sherwin Earl, Germantown, MD (US); Lonny Miller, Woodbridge, VA (US)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 16/603,535

(22) PCT Filed: Feb. 19, 2018

(86) PCT No.: PCT/EP2018/054003
§ 371 (c)(1),
(2) Date: Oct. 7, 2019

(87) PCT Pub. No.: WO2018/184760
PCT Pub. Date: Oct. 11, 2018

(65) Prior Publication Data
US 2020/0034586 A1    Jan. 30, 2020

Related U.S. Application Data

(60) Provisional application No. 62/481,887, filed on Apr. 5, 2017.

(30) Foreign Application Priority Data

May 4, 2017 (EP) ..................... 17169495

(51) Int. Cl.
*G06K 7/10* (2006.01)
*B65G 47/244* (2006.01)

(52) U.S. Cl.
CPC ....... *G06K 7/10861* (2013.01); *B65G 47/244* (2013.01); *B65G 2203/041* (2013.01); *B65G 2203/044* (2013.01)

(58) Field of Classification Search
CPC .......... G06K 7/10861; G06K 7/10871; G06K 7/10762; B65B 35/58; B65G 47/244; B65G 47/252; B65G 2203/041; B65G 2203/044
(Continued)

(56) References Cited

U.S. PATENT DOCUMENTS 3,986,323 A    10/1976   Aidlin et al.
5,028,769 A *   7/1991   Claypool .............. B07C 5/3412
                                                         235/454

(Continued)

FOREIGN PATENT DOCUMENTS

EP    0256804    2/1988
EP    2624042    4/2016

OTHER PUBLICATIONS

International Search Report and Written Opinion issued with respect to application No. PCT/EP2018/054003, dated May 8, 2018.
(Continued)

*Primary Examiner* — Suezu Ellis
(74) *Attorney, Agent, or Firm* — Muncy, Geissler, Olds & Lowe, P.C.

(57) ABSTRACT

Device and method of reading a mark printed on containers moving along a conveyor, wherein the mark is printed on a lateral portion of the container. The device comprises a drive unit for applying torque on a container in a reading area to generate rotation along its vertical axis, and a camera for reading the mark while the container is spinning. The drive unit comprises a motor and a spinner disposed at a first zone of the reading area for applying torque on a lateral wall of the container. The device comprises a pushing assembly, e.g. an air knife applying high-pressure air flow that drives the container towards the first zone to ensure rotational move-
(Continued)

ment of the container. The device allows safe capture of the mark at high line feeding speeds.

14 Claims, 8 Drawing Sheets

(58) Field of Classification Search
USPC .............................................. 235/375, 462.14
See application file for complete search history.

(56) References Cited

U.S. PATENT DOCUMENTS

| | | |
|---|---|---|
| 5,451,125 A | 9/1995 | Lenhart |
| 5,919,028 A * | 7/1999 | Edqvist ................ B65G 47/082 414/754 |
| 2006/0277269 A1 | 12/2006 | Dent et al. |
| 2014/0284380 A1 | 9/2014 | Toedtli |

OTHER PUBLICATIONS

International Preliminary Report on Patentability issued with respect to application No. PCT/EP2018/054003, dated Mar. 4, 2019.

* cited by examiner

DEVICE AND METHOD OF READING A MARK PRINTED ON CONTAINERS MOVING ALONG A CONVEYOR

FIELD

The present disclosure is comprised in the field of ID readers. In particular, the invention relates to methods and systems for detecting and identifying marks or signs, such as barcodes, printed on a lateral wall of containers moving along a line.

BACKGROUND

ID readers are currently used to track and sort objects moving along a line (for instance by means of a conveyor) in manufacturing and logistics operations. The ID reader can be positioned over the line at an appropriate viewing angle to acquire any expected IDs on respective objects as they each move through the field of view. The focal distance of the reader with respect to the object can vary, depending on the placement of the reader with respect to the line and the size of the object. A larger object may cause IDs thereon to be located closer to the reader, while a smaller object may contain IDs that are further from the reader. In each case, the ID should appear with sufficient resolution to be properly imaged and decoded. Therefore, the field of view of a single reader, particularly in with widthwise direction (perpendicular to line motion) is often limited. Where an object and/or the line is relatively wide, the lens and sensor of a single ID reader may not have sufficient field of view in the widthwise direction to cover the entire width of the line while maintaining needed resolution for accurate imaging and decoding of IDs. Failure to image the full width can cause the reader to miss IDs that are outside of the field of view.

Several techniques can be employed to overcome the limitation in field of view of a single ID reader and expand the overall field of view in the widthwise direction. For instance, a line-scan system with inherently wider FOV can be employed; however, this arrangement increase complexity and costs as it requires more specialized hardware (an encoder is often needed to sense relative movement of the line when using a line-scan arrangement). Another technique is to employ a larger sensor in the single ID reader to provide the desired resolution for appropriately imaging the scene along the widthwise direction; however, this approach entails additional cost through the use of less-conventional hardware and an enlarged FOV resolution. The increased height direction may cause the sensor to capture the same ID in a plurality of captured image frames as the object passes through the enlarged field of view. This, in turn leads to extraneous processing and/or decoding of the same ID and the risk that a single object is mistaken for a plurality of objects passing under the reader. Another technique is disclosed in patent document EP2624042-B1, which provides a field of view expander using several mirrors.

However, when the object moving along the line is a container, and the mark to be read is a barcode printed on a cylindrical portion of the lateral wall of the container, the use of a single ID reader does not guarantee the correct identification and reading of the mark, even if the field of view of the single ID reader has been expanded. The mark may be placed on the opposite side of the lateral wall relative to the framing of the ID reader, such that the container passes thorough the reading area undetected.

To make sure that the mark printed on the cylindrical portion of the container is always read, one can employ multiple ID readers or cameras disposed around a reading area of the line such that at least one of the cameras is able to capture the mark of the container. For example, known systems require the use of four cameras to read the mark printed on a bottle or can. However, this solution presents several drawbacks. Firstly, this is an expensive and complex solution that requires additional hardware and optics (several cameras) which in some cases must be fully synchronized. Moreover, this system cannot guarantee that every container will present a full view of the mark to one of the cameras while progressing down the conveyer. For example, when the conveyor transporting the containers is wide enough to allow two or more containers passing by at the same time, the mark printed on some of these containers may be obfuscated (e.g. partially or fully covered) by the presence of other containers blocking the field of view. Besides, the special arrangement of the mark on a cylindrical wall makes it difficult to capture the full mark by one camera (i.e. in some cases the cameras only can partially capture the mark), rendering the barcode undetected, unless a specific and complex software is used to integrate the different images of the cameras to detect the mark (e.g. by stitching the different barcode fragments to generate an entire code). Furthermore, when the line is running fast (e.g. with a feeding frequency of more than 80 containers per minute), all these problems are aggravated.

Therefore, there is a need for a device and method that allows safe capture, with a success rate of 100%, of marks (such as 1D or 2D barcodes) printed on a container moving on a horizontal conveyor. Preferably, container codes must be read at a rate capable of sustaining the line feeding frequency for these kinds of containers (normally of around 60 to 120 containers per minute).

SUMMARY

The present invention refers to a device and a method of reading a mark printed on a lateral portion of containers moving along a line or conveyor that overcome the above-mentioned problems. With this device and method, the containers running on a conveyor are pushed against a drive device which spins the container, so that a camera is able to read the mark applied on the container.

For the description of the present invention the following definitions will be considered hereinafter:
Line: elements in a system, included for instance in a plant or factory, for processing and/or conveying products, such as for example a packaging line, filling line, storage line, manufacturing line and assembly line.
Conveyor: means of transport for products in a line, such as e.g. a belt conveyor system or a roller conveyor. The conveyor is usually arranged in the horizontal plane but it may also include ramps and direction changes.
Container: a term normally used in a line referring to products, objects or receptacles being transported through the line for quality assessment, product identification and traceability, inventory and warehouse management, production monitoring, etc. The container may be made of different materials, such as for example metal, plastic or glass. The containers include bottles, cans, tins, and water carboys.
Mark or identity (ID): Any sign or symbol, text or graphic, including but not limited to identification codes, printing inks and barcodes (e.g. 1D or 2D barcodes), printed or attached to a container, mainly for identification, inventory or classification purposes.

Lateral portion of a container: an area of the lateral wall of the container on which the mark is printed, or attached to. The lateral portion may be cylindrical.

Reading area: zone of the conveyor in which the reading or identification of the mark is performed.

Spinner: any means for contacting the container to apply torque and generate rotation, such as a roller spinning at high speed and contacting the lateral wall of the container.

Drive unit: an electric and/or electronic module comprising a motor for activating the spinner.

High-speed camera: device suitable for recording fast-moving objects, such as containers rotating at speeds higher than 300 rpm.

In accordance with one aspect of the present invention there is provided a method of reading a mark printed on containers moving along a conveyor. The method comprises supplying a container into a reading area, applying torque on the container at least in the reading area, generating rotation of said container along a vertical axis thereof, and reading the mark of the container while the container is spinning.

In an embodiment, the step of generating rotation of the container comprises applying torque by a spinner on a lateral wall of the container at a first zone of the reading area, and pushing the container against the spinner to ensure rotational movement of the container. The step of pushing the container against the spinner may comprise applying or ejection, respectively, of a high-pressure air flow directed at least partially towards the first zone of the reading area.

In an embodiment, the containers are supplied into the reading area one at a time. The method may further comprise retaining the container in the reading area by exerting force against the running direction of the conveyor.

According to an embodiment, the method also comprises extracting the container out of the reading area; for instance, by propelling the container with a high-pressure air flow. The reading of the mark is preferably performed while the container is positioned in the reading area. Alternatively, the reading may be performed after the container has left the reading area (e.g. in another direction or even another conveyor).

For a better control and synchronization of the reading, the method may also comprise detecting the container when entering the reading area. The mark is preferably registered and detected using a high-speed camera, due to the high spinning speed of the container.

In accordance with a further aspect of the present invention there is provided an apparatus or device for reading a mark printed on containers moving along a conveyor, wherein the mark is printed on a lateral portion of the container. The device comprises a drive unit configured to apply torque on a container at least in a reading area, to generate rotation of the container along a vertical axis thereof, and a camera (preferably a high-speed camera) configured to read the mark of the container while the container is spinning. The device may also comprise a supplier (such as a conveyor belt) configured to supply the container to the reading area. When supplying a plurality of containers running on the conveyor at high speed, the device may also comprise, in order to facilitate the reading, guiding means for directing the containers towards the reading area, such that they arrive at the reading area one at a time.

According to an embodiment, the drive unit comprises a spinner (e.g. a roller or a knurled roller) activated by a motor. The spinner is arranged at a first zone of the reading area for applying torque on a lateral wall of the container. In this embodiment, the device further comprises a pushing assembly configured to drive the container towards the first zone to ensure rotational movement of the container.

In an embodiment, the pushing assembly may be implemented as an air knife, or a similar pneumatic device with air nozzles, configured to apply/eject a high-pressure air flow directed at least partially towards the first zone of the reading area. In another embodiment, the pushing assembly comprises a roller configured to exert contact force (instead of using a high-pressure air flow) on the container towards the first zone of the reading area.

The device may further comprise an ejector for extracting the container out of the reading area. In an embodiment, the ejector is configured to propel the container using a high-pressure air flow. Alternatively, the ejector may directly hit the container to exert contact force (e.g. a piston or a lever).

In an embodiment, the device comprises one or more retention elements configured to retain the container in the reading area by exerting force at least against the running direction of the conveyor.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

A series of drawings which aid in better understanding the invention and which are expressly related with an embodiment of said invention, presented as a non-limiting example thereof, are very briefly described below.

DETAILED DESCRIPTION

Figure 1A:
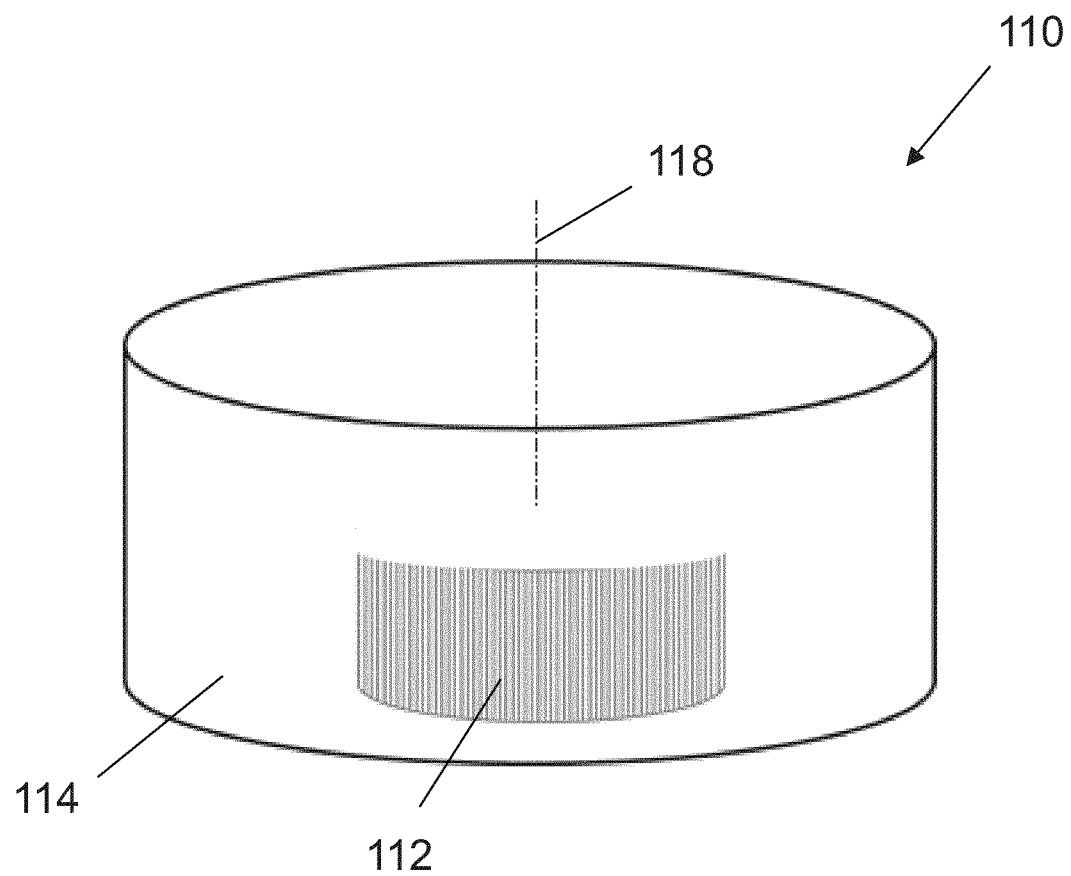
FIG. 1A depicts a linear barcode printed on a cylindrical container.
Figure 1B:
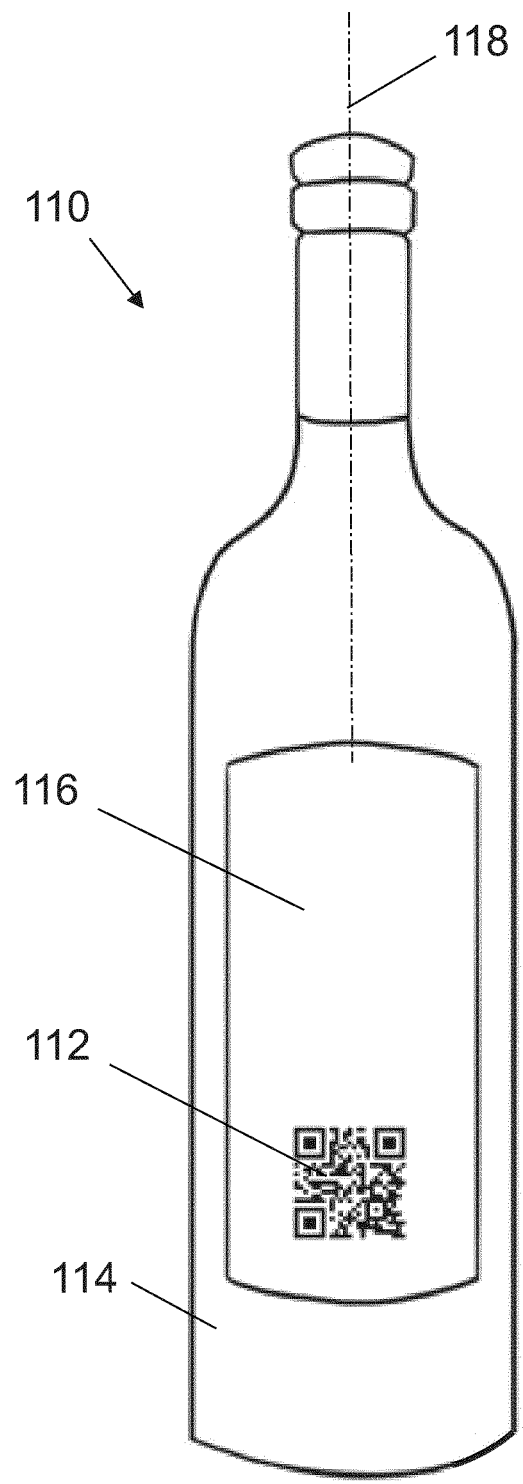
FIG. 1B shows a 2D barcode printed on a bottle.

The present invention relates to a method and device for reading a mark 112 printed on a lateral portion 114 of the lateral wall of a container 110, as depicted in FIGS. 1A and 1B. In the container shown in these figures, the lateral portion is a cylindrical portion. The container 110 has a circular base and a vertical axis 118 around which the container 110 can rotate. The container may be, for instance, a can (FIG. 1A) or a bottle (FIG. 1B). The mark 112 may be a sign, an identification code, a barcode or any other text or graphic symbol printed on a label 116 attached to, or directly printed on, the lateral portion 114 of the lateral wall of the container 110. The barcode may be, for instance, a linear barcode, as in FIG. 1A, or a matrix barcode (e.g. Data Matrix, QR codes), as in the example of FIG. 1B.

Figure 2:
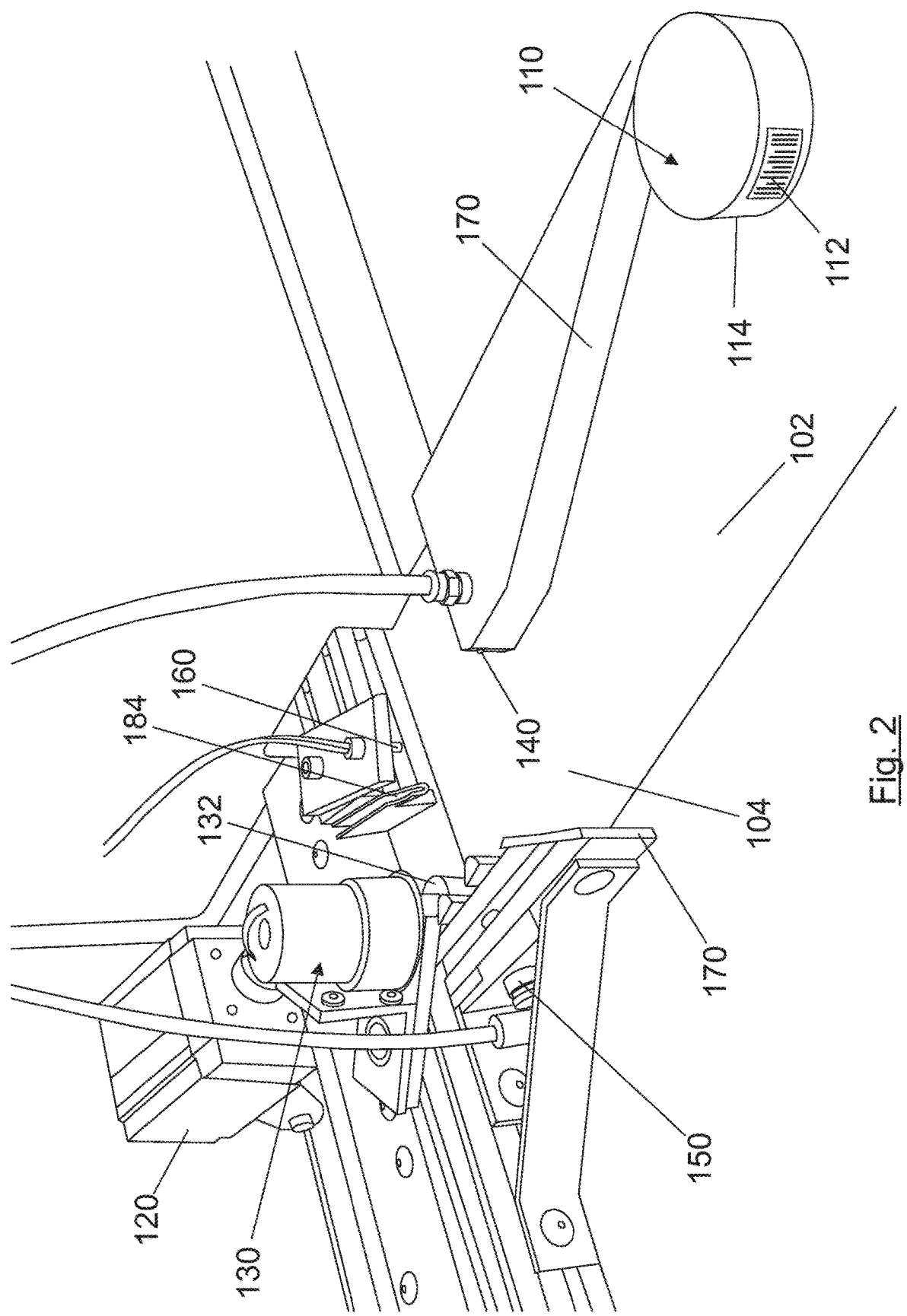
FIG. 2 shows a perspective view of the device for reading barcodes on containers according to an embodiment of the present invention.

According to an embodiment, the components of the device are depicted in the perspective view of FIG. 2. The containers 110 move along a line (e.g. a conveyor belt in a packaging line) at high speed. The device can perform a mark reading at rates higher than 80 containers per minute. In the embodiment of FIG. 2, the conveyor 102 belt drives the containers 110 to a reading area 104. Guiding means for directing the containers 110 towards the reading area 104 may be provided on the conveyor 102, such that the containers 110 arrive at the reading area 104 one at a time. The guiding means may be implemented, for instance, as one or more funnel-shaped channels 170 forcing the containers 110 to move towards the reading area 104. The containers 110 moving on the conveyor 102 reach the reading area 104 separately, one by one, and a detector 160 (e.g. a photoelectric sensor) detects the container 110 when entering the reading area 104.

A drive unit 130 applies angular momentum to the container 110 located in the reading area 104, rotating the container 110 along its vertical axis 118. A camera 120, preferably a high-speed camera, is arranged in a tilted position above the conveyor 102 for reading the mark 112 printed on the lateral portion 114 of the container 110 while the container 110 is spinning. As the container 110 rotates in front of the camera 120, the latter has several opportunities to capture the mark 112. The mark 112 is captured in the allotted time frame so that the overall throughput of the line is not affected (further containers 110 enter the reading area 104 at a high rate).

In an embodiment, the camera 120 is positioned next to the reading area 104, as shown for instance in FIG. 2, so that the mark reading is carried out when the container 110 is still positioned in the reading area 104. The start of the reading is synchronized with the detection made by the detector 160. Before applying any torque, the angular velocity of the container 110 entering the reading area 104 is normally zero. The camera 120 starts recording multiple images of the lateral wall of the container 110 while the angular velocity is speeding up. The high frame rate of the images captured by the camera 120 allows detection and identification of the mark 112.

In another different embodiment, not shown in the figures, the camera 120 may be located at a different station of the processing line, away from the reading area 104. In that case, the container 110 is extracted from the reading area 104 with the force exerted by an ejector 150, sending the container 110 (while still spinning) to a different conveyor where the camera 120 is arranged.

Figure 3:
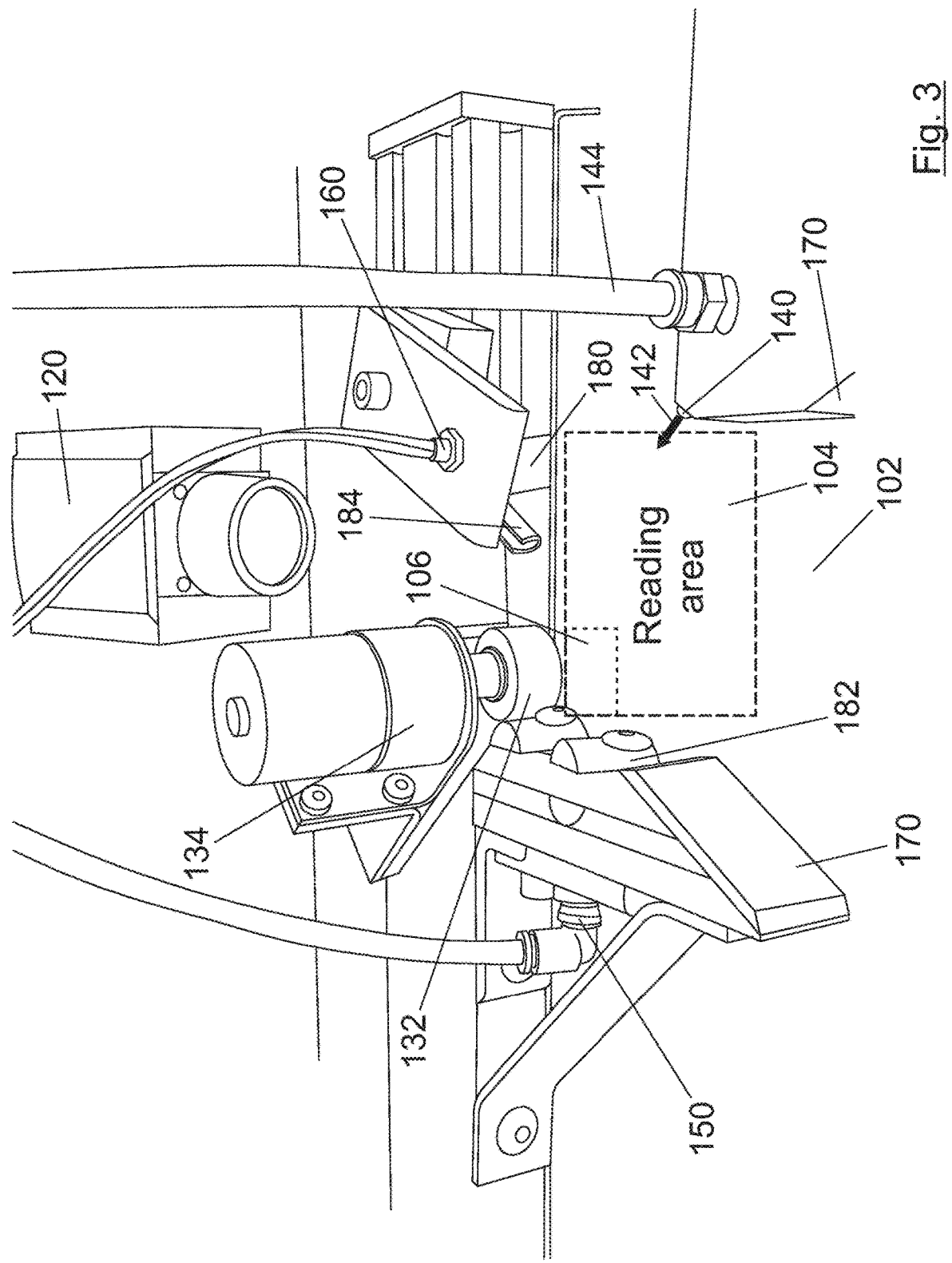
FIG. 3 represents a front view of the device.

FIG. 3 represents a front view of the reading area 104, according to an embodiment. In this embodiment the drive unit 130 comprises a spinner 132 activated by a motor 134 (e.g. a DC or a stepper motor) managed by a motor control unit. The spinner may be, for instance, a wheel or drive roller. In the embodiment of FIG. 3 a knurled roller, of about 25 mm-diameter, is mounted on a 6 mm shaft, and the diameter of the containers is around 63 mm. The motor speed is controlled by the motor control unit and the spinner 132 is connected to the shaft of the drive motor. The wheel 132 generates rotational movement of the container 110 through friction between the knurled roller and the lateral wall of the container. In an embodiment, the motor rotates within a range of 600-1000 rpm, and at full speed the container reaches a maximum rotating speed of about 285-315 rpm (the spinning speed of the container depends on multiple factors, such as the weight, torque applied, slip, belt surface friction parameter, etc.).

The wheel 132 is arranged at a first zone 106 of the reading area 104, hanging suspended at a certain height above the conveyor 102. The rotating wheel 132 engages the lateral wall of the container 110, applying torque. To facilitate engagement between the wheel 132 and the container 110, a pushing assembly simultaneously exerts a force on the container 110 to push it towards the first zone 106 and ensure consistent rotational movement of the container 110. The pushing assembly assists in forcing contact between the drive wheel 132 and the container.

The pushing assembly may be implemented with an air knife 140 that ejects a high-pressure air flow 142 towards the first zone 106 of the reading area 104. The air knife 140 employs a pressurized air source 142 and appropriately angled nozzles to direct the air stream against the container 110, forcing the container to contact the wheel 132.

In another embodiment, not shown in the figures, instead of using an air flow the pushing assembly may exert physical, mechanical contact. For instance, the pushing assembly may comprise a roller assembly that exerts contact force on the lateral wall of the container 110 towards the first zone 106 of the reading area 104, pushing and holding the container against the wheel 132. The pushing assembly may also comprise a linkage unit, such as a connecting rod, and an electromechanical solenoid or a pneumatic solenoid for electronic control and activation of the linkage unit.

Figure 4:
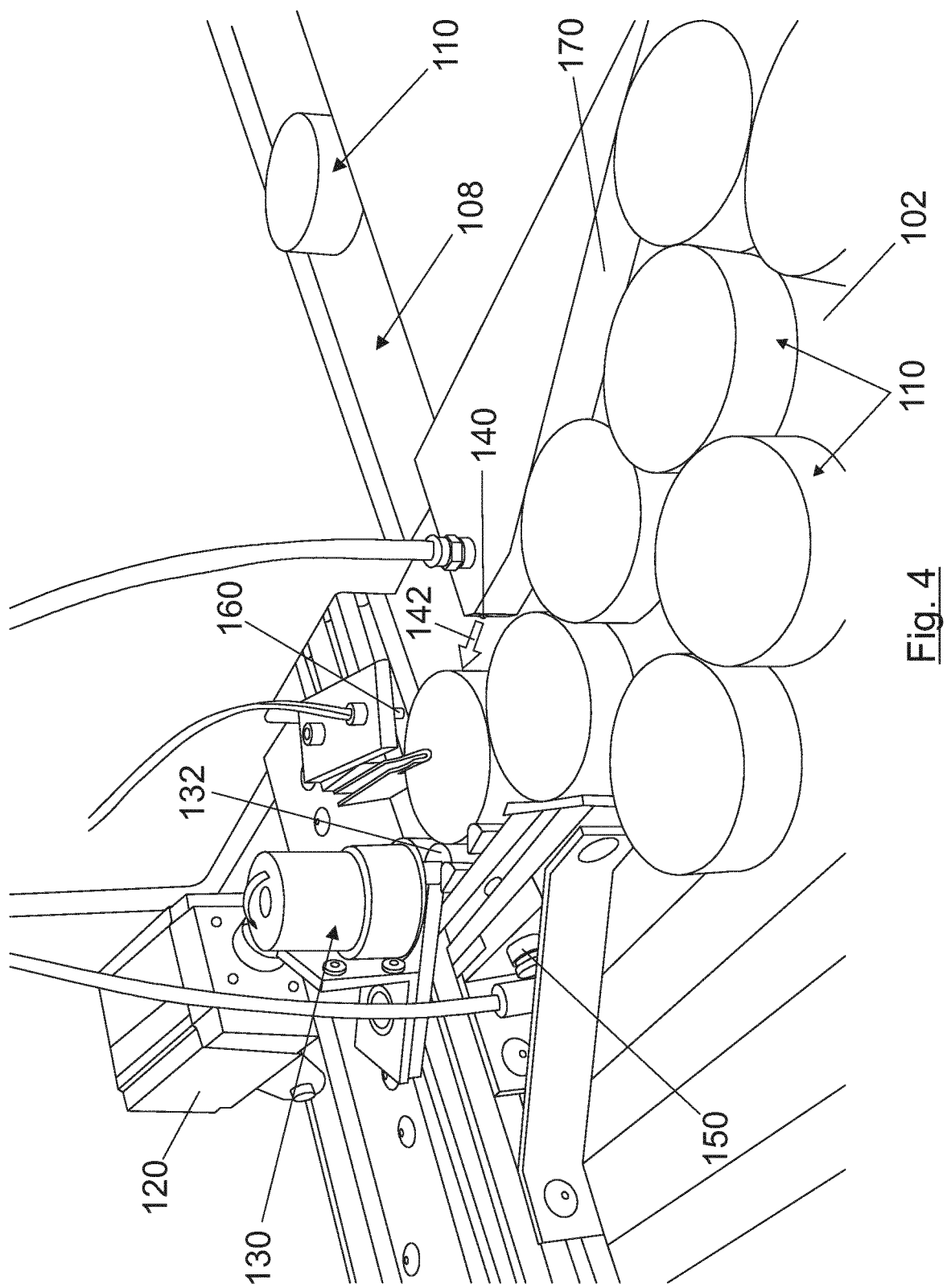
FIG. 4 illustrates the device working on a packaging line carrying multiple containers towards the reading area.

A running packaging line is shown in FIG. 4. Multiple containers 110 are carried by the conveyor 102 having a width that allows two or more containers running in parallel. The guiding means 170 drive the containers 110 such that they arrive at the reading area 104 one at a time.

Figure 5:
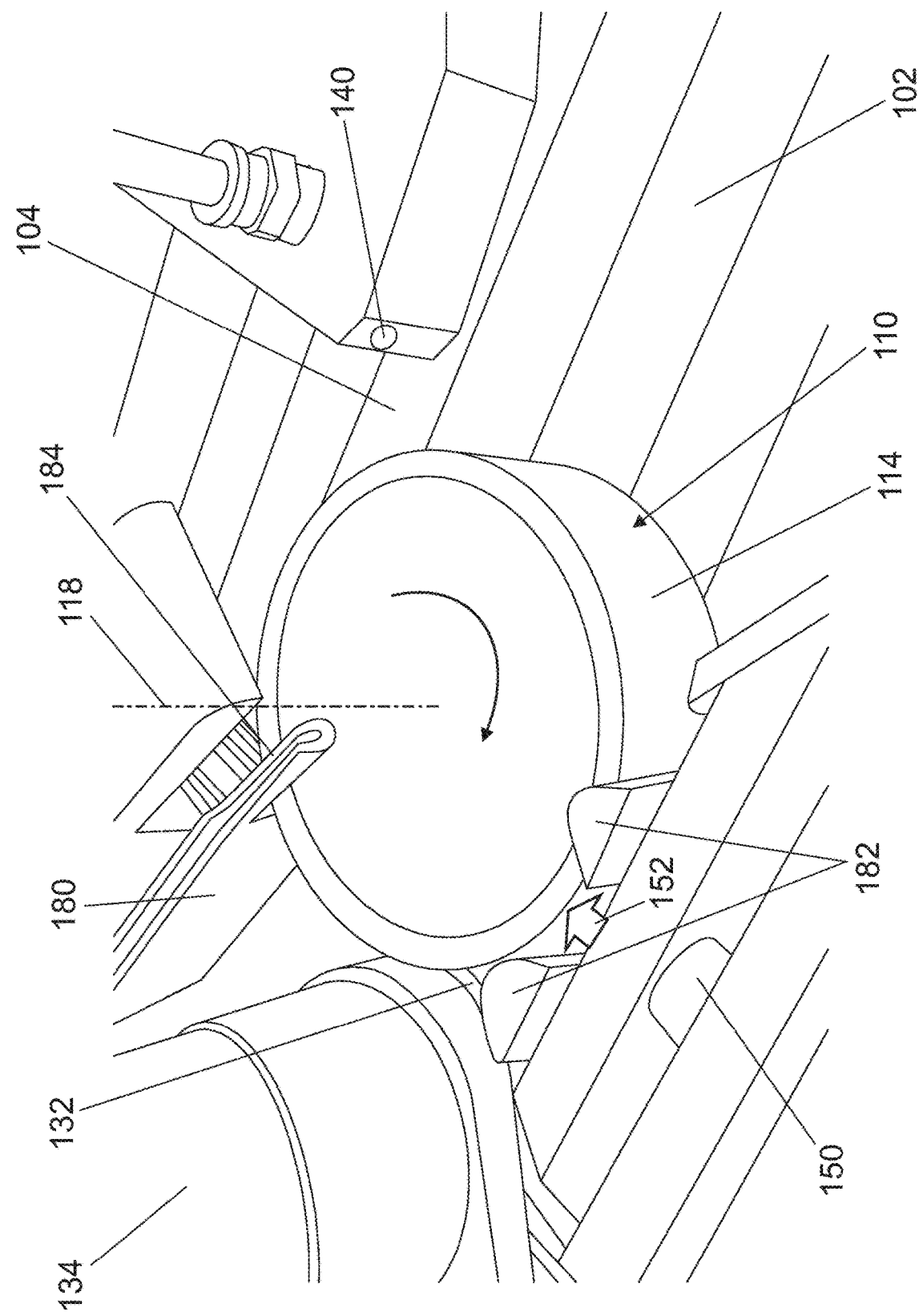
FIG. 5 depicts a container being angularly accelerated in the reading area, while the high-speed camera detects the barcode.

FIG. 5 depicts an individual container 110 spinning within the reading area 104. The device comprises a retention element 180 disposed at an end of the reading area 104 for retaining the container 110 inside the reading area 104 by exerting force against the running direction of the conveyor 102. The device may further comprise lateral retention elements 182 disposed laterally with respect to the running direction of the belt, and an upper retention element 184 disposed at a higher position than the maximum height of the container 110 to avoid the container 110 accidentally jumping out of the conveyor 102 when the torque and/or the high-pressure air flows (142, 152) are applied.

Once the mark 112 has been read, or at a predetermined timing, the ejector 150 is activated to extract the container 110 out of the reading area 104 and allow an additional container 110 entering the reading area 104. In the embodiment of FIG. 5, the container 110 is propelled using a high-pressure air flow 152 (which in this embodiment is perpendicular to the line motion, the running direction of the conveyor 102), being driven up to another conveyor 108.

The activation of some of the electronically-controllable elements of the device can be synchronized once the detection of the container 110 is performed by the photoelectric sensor. In an embodiment, this detection triggers, with an appropriate timing, the high-pressure air flow 142 from the air knife 140 and the rotation of the drive wheel 132. After a predetermined time, the high-pressure air flow 152 from the ejector 150 is activated to drive the container out of the reading area 104 onto another conveyor 108 (the air knife 140 may be deactivated a short time to facilitate extraction of the container).

Figure 6:
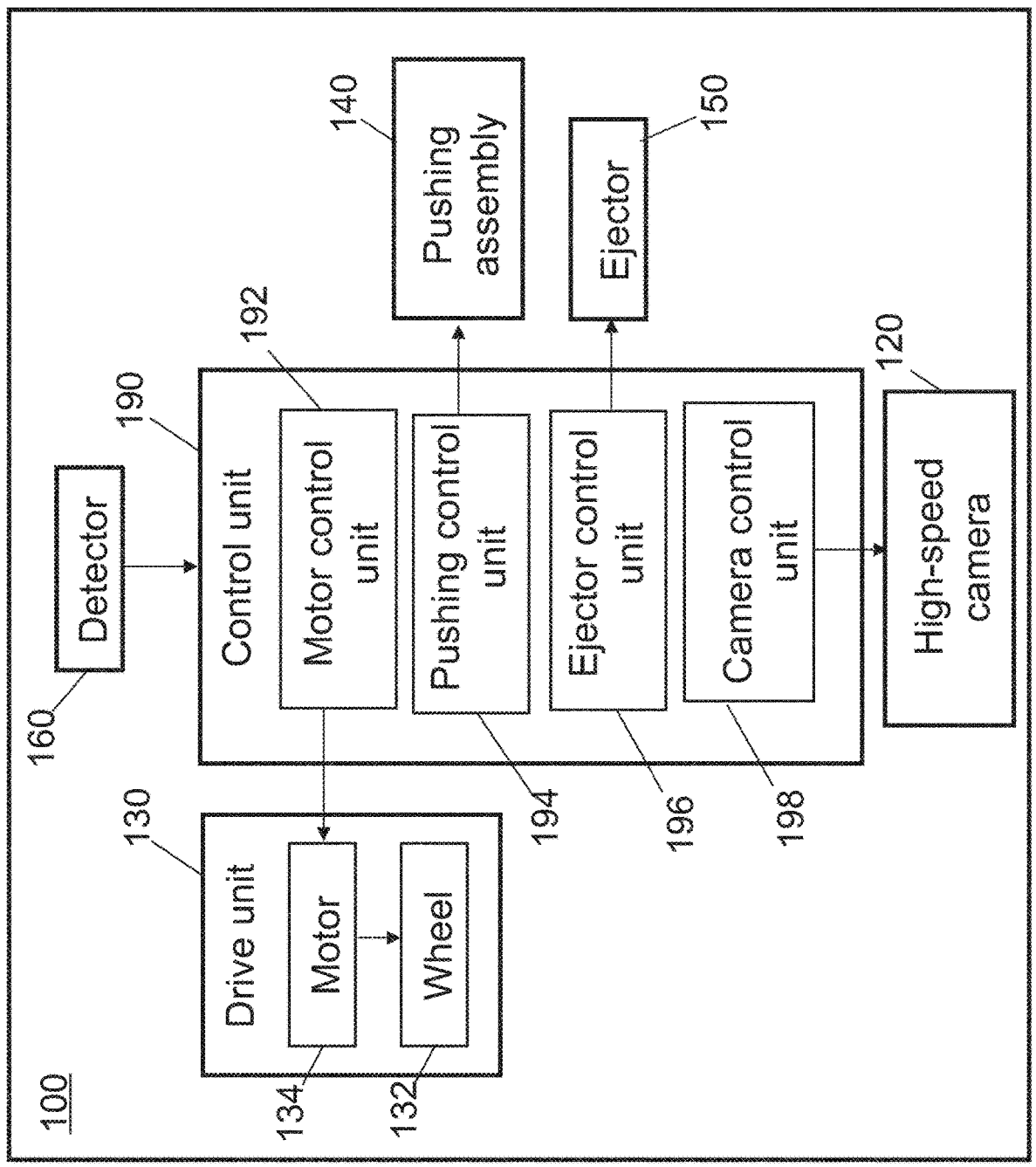
FIG. 6 represent a block diagram of the device according to an embodiment.

FIG. 6 illustrates an exemplary embodiment of a block diagram including the relevant elements of the device 100. The detector 160 sends a signal to a control unit 190, which may comprise a microprocessor, a microcontroller, a PLC, a FPGA or any other electronically programmable device. A motor control unit 192, a pushing control unit 194 and an ejector control unit 196 are responsible for controlling the activation of the motor 134, the pushing assembly 160 and the ejector 150, respectively. The camera 120 is managed by a camera control unit 194. The detection signal received from the detector 160 is used by the control unit 190 to synchronize the activation of the different elements.

Figure 7:
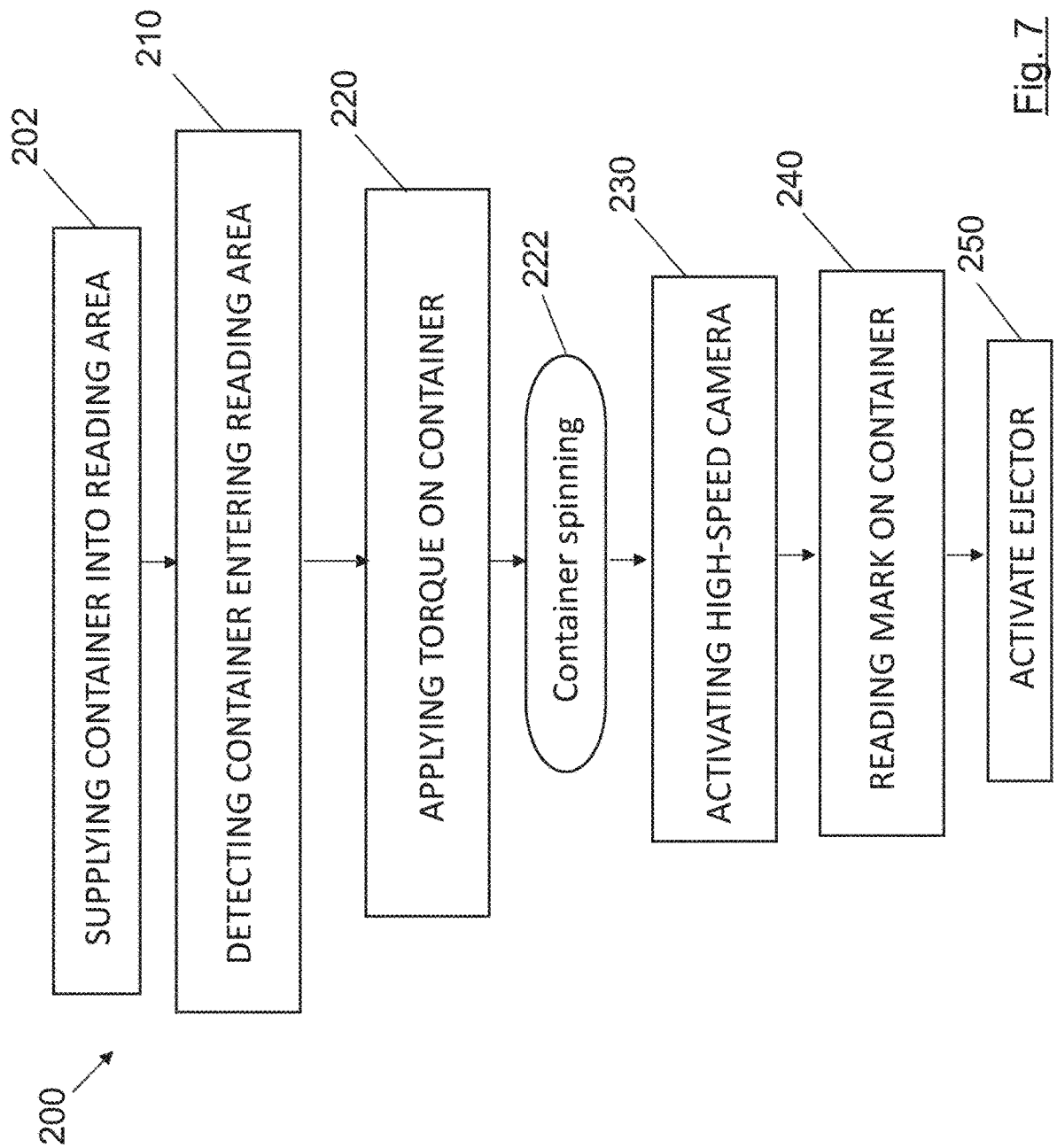
FIG. 7 shows a flow diagram of the method according to an embodiment.

In FIG. 7 a flow diagram of an exemplary embodiment of the method 200 is depicted. A container 110 is supplied 202 into a reading area 104. Once the container 110 reaches the reading area 104, the container 110 is detected 210 and a torque 220 is applied on the container 110, such that the container spins 222 along its vertical axis 118. The control unit 190 activates the high-speed camera 230 to read the mark 240 printed on the container while the container 110 is spinning. Finally, the ejector 150 is activated 250 by the control unit 190 to propel the container 110 out of the reading area 104.

The invention claimed is:

1. A method of reading a mark printed on containers moving along a conveyor, wherein the mark is printed on a lateral portion of the containers, the method comprising:
   supplying a container into a reading area;
   applying torque on the container at least in the reading area to rotate said container along a vertical axis thereof;
   reading the mark of the container while the container is spinning, wherein the step of generating rotation of rotating the container comprises applying torque by a spinner on a lateral wall of the container at a first zone of the reading area, and pushing the container against the spinner to ensure rotational movement of the container, wherein the step of pushing the container against the spinner comprises applying of a first high-pressure air flow directed at least partially towards the first zone of the reading area.

2. The method of claim 1, comprising supplying the containers into the reading area one at a time.

3. The method of claim 1, further comprising extracting the container out of the reading area.

4. The method of claim 3, wherein the extraction of the container comprises propelling the container with a second high-pressure air flow.

5. The method of claim 1, further comprising retaining the container in the reading area by exerting force against a running direction of the conveyor.

6. The method of claim 1, wherein the reading of the mark is performed while the container is positioned in the reading area.

7. The method of claim 1, further comprising detecting the container entering the reading area.

8. The method of claim 1, wherein the reading of the mark is performed using a high-speed camera.

9. A device for reading a mark printed on containers moving along a conveyor, wherein the mark is printed on a lateral portion of the container, the device comprising:
   a drive unit configured to apply torque on a container at least in a reading area to rotate the container along a vertical axis thereof;
   a camera configured to read the mark of the container while the container is spinning, wherein the drive unit comprises a spinner activated by a motor, the spinner being arranged at a first zone of the reading area for applying torque on a lateral wall of the container,
   wherein the device further comprises a pushing assembly configured to drive the container towards the first zone to ensure rotational movement of the container,
   wherein the pushing assembly comprises an air knife, configured to apply a first high-pressure air flow directed at least partially towards the first zone of the reading area.

10. The device of claim 9, wherein the spinner comprises a knurled roller.

11. The device of claim 9, further comprising an ejector for extracting the container out of the reading area.

12. The device of claim 11, wherein the ejector is configured to propel the container using a second high-pressure air flow.

13. The device of claim 9, further comprising at least one retention element configured to retain the container in the reading area by exerting force against a running direction of the conveyor.

14. The device of claim 9, wherein the camera is a high-speed camera.

* * * * *